(12) United States Patent
Tsen et al.

(10) Patent No.: US 12,530,059 B2
(45) Date of Patent: Jan. 20, 2026

(54) CAMERA INTEGRATED GLASS REFLECTION CANCELLATION

(71) Applicant: DELL PRODUCTS L.P., Round Rock, TX (US)

(72) Inventors: Chiu Jung Tsen, Zhubei (TW); Chih Hao Kao, Singapore (SG); Chin Chung Wu, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 188 days.

(21) Appl. No.: 18/485,129

(22) Filed: Oct. 11, 2023

(65) Prior Publication Data

US 2025/0123658 A1    Apr. 17, 2025

(51) Int. Cl.
| | |
|---|---|
| *G06F 1/16* | (2006.01) |
| *G03B 9/52* | (2021.01) |
| *G03B 11/04* | (2021.01) |
| *G03B 17/12* | (2021.01) |
| *G06V 10/60* | (2022.01) |
| *G06V 40/16* | (2022.01) |

(52) U.S. Cl.
CPC ............ *G06F 1/1686* (2013.01); *G03B 9/52* (2013.01); *G03B 17/12* (2013.01); *G06V 10/60* (2022.01); *G06V 40/171* (2022.01); *G03B 11/041* (2013.01); *G03B 2217/002* (2013.01)

(58) Field of Classification Search
CPC ..................................... G03B 11/041
See application file for complete search history.

(56) References Cited

U.S. PATENT DOCUMENTS

| | | | |
|---|---|---|---|
| 9,842,549 B2 | 12/2017 | Musgrave et al. | |
| 10,228,571 B2 * | 3/2019 | Wada | G03B 17/14 |
| 11,451,744 B2 | 9/2022 | Swierk et al. | |
| 11,846,845 B2 * | 12/2023 | Hsieh | G02B 27/281 |
| 11,943,524 B2 * | 3/2024 | Kim | G02B 7/021 |
| 2022/0232189 A1 | 7/2022 | Swierk et al. | |
| 2023/0262340 A1 | 8/2023 | Yap et al. | |
| 2024/0377650 A1 * | 11/2024 | McCarty | G02B 27/286 |

FOREIGN PATENT DOCUMENTS

| | | | | |
|---|---|---|---|---|
| KR | 20220059176 A | * | 5/2022 | H04N 5/265 |
| WO | WO-2015174065 A1 | * | 11/2015 | G03B 15/00 |

* cited by examiner

*Primary Examiner* — Leon W Rhodes, Jr.
(74) *Attorney, Agent, or Firm* — Larson Newman, LLP (57) ABSTRACT

An information handling system has a camera disposed in a display device, and a privacy shutter configured to selectively rotate a polarizer to a first orientation or a second orientation. One of the first orientation or the second orientation is used to filter reflected polarized light.

12 Claims, 9 Drawing Sheets

CAMERA INTEGRATED GLASS REFLECTION CANCELLATION

FIELD OF THE DISCLOSURE

The present disclosure generally relates to information handling systems, and more particularly relates to a camera-integrated glass reflection cancellation.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system has a camera disposed in a display device, and a privacy shutter configured to selectively rotate a polarizer to a first orientation or a second orientation. One of the first orientation or the second orientation is used to filter reflected polarized light.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
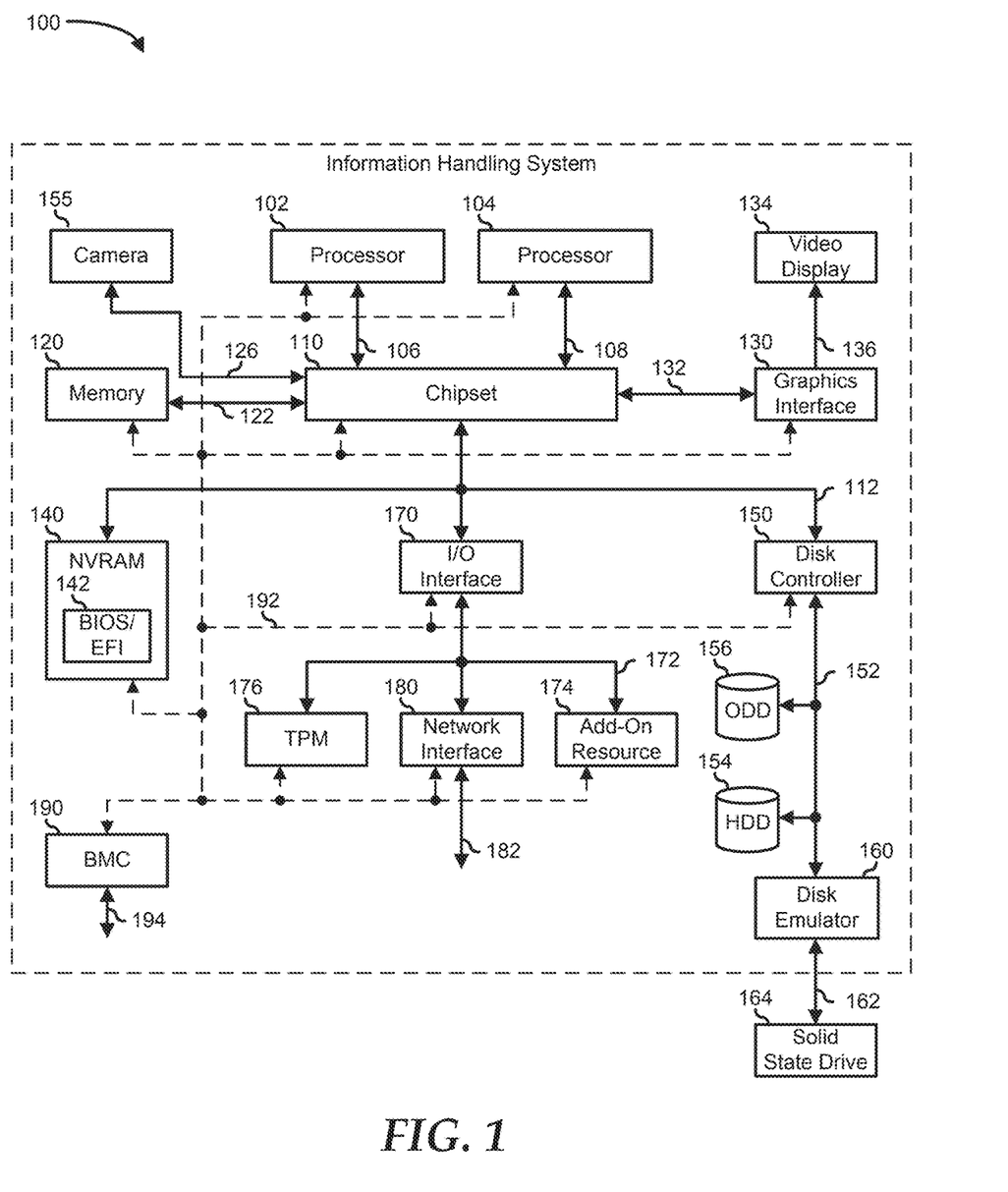
FIG. 1 is a block diagram illustrating an information handling system according to an embodiment of the present disclosure.

FIG. 1 illustrates an embodiment of an information handling system 100 including processors 102 and 104, a chipset 110, a memory 120, a camera 155, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Camera 155 is connected to chipset 110 via a camera interface 126. Camera 155 may be capable of receiving visible light to capture images and video. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include a $I^2C$ bus, a System Management Bus (SMBus), a Power Management Bus (PMBUS), a Low Pin Count (LPC) interface, a serial bus such as a Universal Serial Bus (USB)

or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/ operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, $I^2C$ and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

As videoconferencing has gained popularity, screen reflection on a participant's glasses present issues. In addition to a potential distraction to other participants, the reflection may cause privacy and/or security. To address these and other concerns, the present disclosure provides a system and method of using a polarizer to filter the screen reflection.

Figure 2:
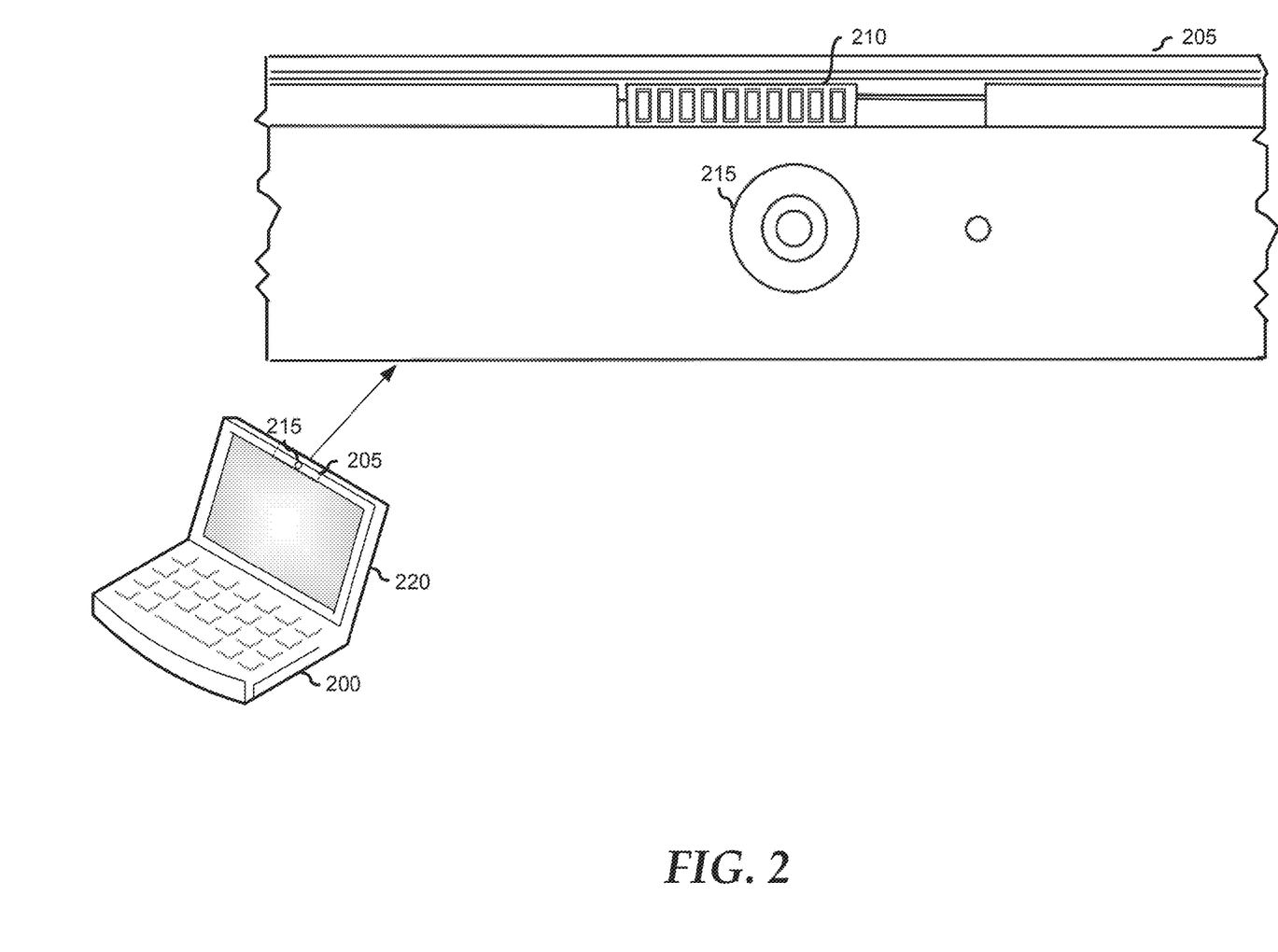
FIG. 2 is a diagram of an information handling system with an enlarged view of a display assembly section.

FIG. 2 shows an information handling system with an enlarged view of a display assembly section. Information handling system 200, which is similar to information handling system 100 of FIG. 1, includes a display assembly 220, a slider 210, and a camera 215 integrated in section 205 of the display assembly. Display assembly 220 is similar to video display 134 of FIG. 1. Camera 215, which is similar to camera 155 of FIG. 1, may be integrated into display assembly 220. Camera 215 may be a computer-mounted or display-mounted electronic device used to capture an image, video, or multimedia content. Camera 215 includes web-based cameras that transmit the image, video, or multimedia content to a requesting browser or entity via a network. Disposed proximate to camera 215 is a privacy shutter with a slider. The privacy shutter may be configured to selectively cover and expose camera 215. Slider 210 may be shaped to manually slide the privacy shutter, such as by using a fingertip.

Display devices, such as display assembly 220 typically include two polarizers stacked perpendicular to each other. As light is projected out of the display, the light is linearly polarized as a front film of the display is generally a polarizer. When the linearly polarized light incidents or falls on a surface, its reflection may still be linearly polarized.

The reflection is typically prominent if the surface is smooth or polished, such as a person's glasses. To minimize or eliminate the reflection, a polarizer is included in section 205. The polarizer may be used to filter or cancel the reflected polarized light. In order to filter or cancel the reflected polarized light, the polarizer may need to match the orientation of the polarizer at the front of the display. Accordingly, the polarizer superimposed unto camera 215 may be rotated, such that the polarizer matches the display polarizer and is perpendicular to the reflected polarized light, which cuts off the reflected polarized light.

Figure 3:
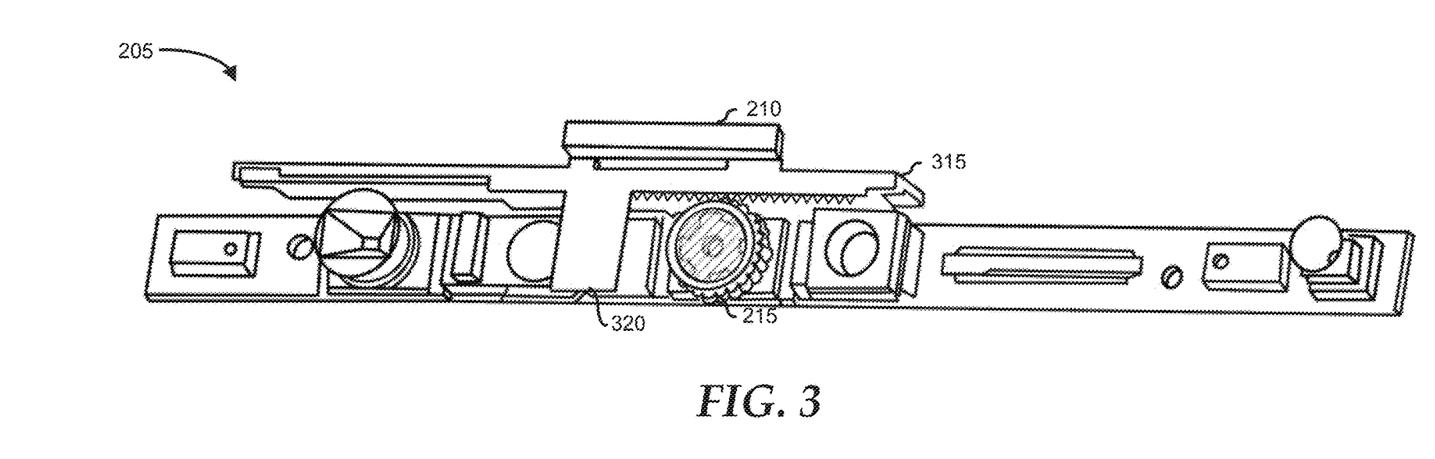
FIG. 3 is a perspective view of a display device section with its top cover removed, according to an embodiment of the present disclosure.

FIG. 3 section 205 with a top cover of the display assembly removed. Section 205 includes a privacy shutter 315, slider 210, camera 215, and security mask 320. Slider 210 and security mask 320 may be physically coupled to privacy shutter 315. Privacy shutter 315 may be moved electrically or mechanically to expose or cover an aperture of camera 215. For example, slider 210 may slide privacy shutter 315 left to right or right to left. In addition, privacy shutter 315 may be selectively moved to a position or mode, such that a polarizer may be superimposed over camera 215 to reduce or eliminate glare and/or reflection on a surface, like the user's glasses. On the other hand, security mask 320 may be made of an opaque material that blocks light, such as mylar, to cover the aperture of camera 215 when privacy shutter 315 is closed.

Figure 4:
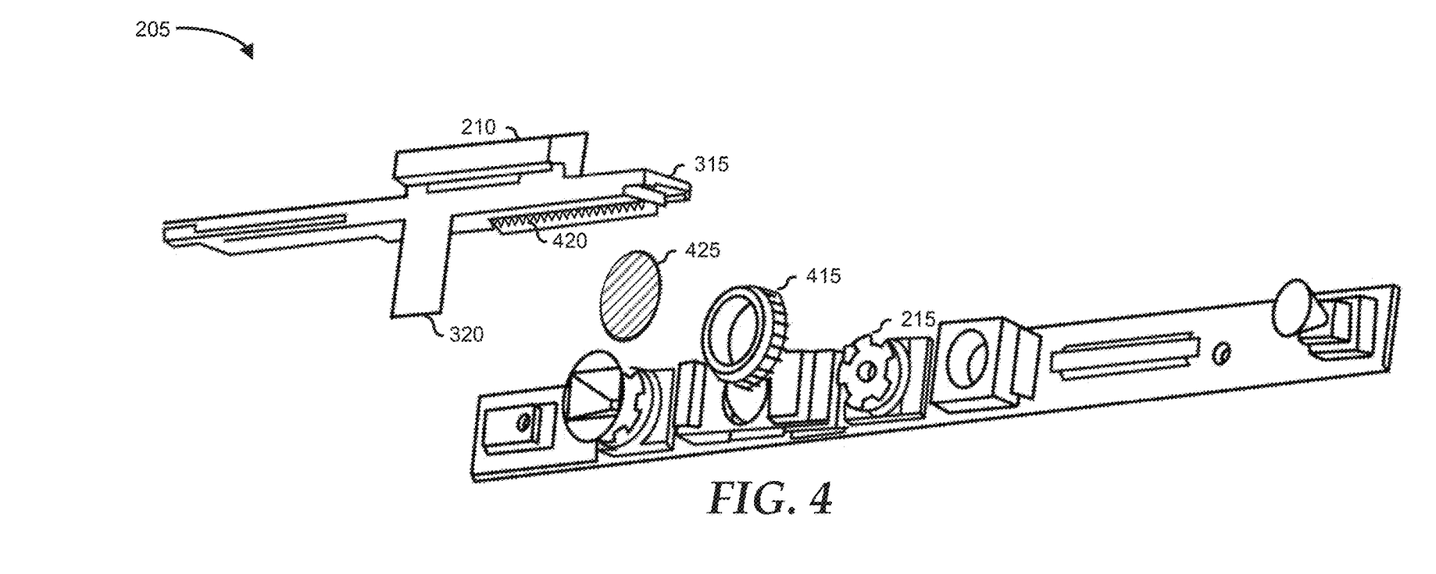
FIG. 4 is an exploded perspective view of a display device section, according to an embodiment of the present disclosure.

FIG. 4 shows section 205 including privacy shutter 315, slider 210, a polarizer 425, a sleeve 415, and camera 215. Sleeve 415 may be inserted into camera 215 as part of a camera assembly which allows the camera assembly to rotate as privacy shutter 315 is moved from one position or mode to another position or mode. In one example, polarizer 425 may be round and physically coupled to an outer side of sleeve 415. In another example, polarizer 425 may be physically coupled onto the other side of sleeve 415. In both examples, polarizer 425 may be configured such that it can rotate with camera 215. However, in another embodiment, polarizer 425 may be physically coupled to sleeve 415, such that polarizer 425 can be rotated independently of camera 215.

Sleeve 415 includes a circular outer gear that may be configured to engage with a linear gear 420 of privacy shutter 315. Together, the circular outer gear of sleeve 415 and linear gear 420 causes privacy shutter 315 to be driven in a line, such as from right to left or left to right. Conversely, moving linear gear 420 linearly via slider 210 may cause the circular outer gear of sleeve 415 to rotate, which in turn rotates polarizer 425 and changes its orientation. Because a polarizer affects polarized light when it is properly oriented at a correct angle, having the ability to rotate the polarizer allows the polarizer to function properly. In another embodiment, friction may be used instead of the gear or a pinion to move privacy shutter 315.

Figure 5:
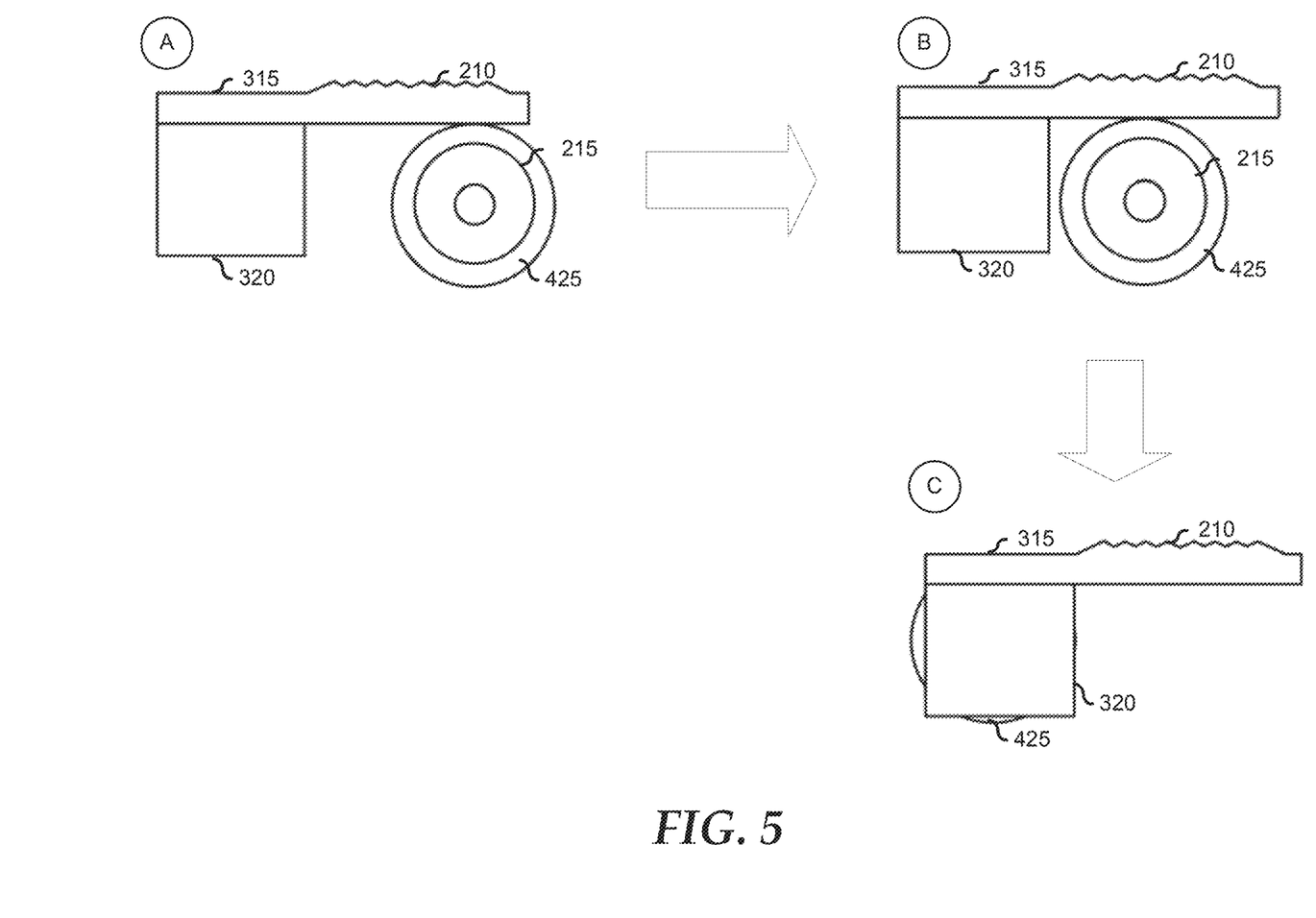
FIGS. 5 and 6 are a series of diagrams that depict how a polarizer is rotated to change its orientation to filter screen reflection, according to an embodiment of the present disclosure.

FIG. 5 shows a series of diagrams that depict how a polarizer is rotated to change its orientation. The diagrams depicted include slider 210, camera 215, privacy shutter 315, security mask 320, and polarizer 425. FIG. 5 is annotated with a series of letters A, B, and C. Each of these letters represents a state or mode of privacy shutter 315, such as an open mode, a closed mode, and a filtered mode. When privacy shutter 315 is in the open or filtered mode, polarizer 425 filters visible light to camera 215, such that camera 215 may capture image data for camera use. When privacy shutter 315 is in the closed mode, security mask 320 blocks visible light to the camera, thus camera 215 may not capture image data. Although these states are ordered for this example, the states illustrate one example to aid in understanding this disclosure and should not be used to limit the claims. Subject matter falling within the scope of the claims can vary with respect to the order of the operations.

At state A, privacy shutter 315 is in a first filtered mode, wherein polarizer 425 is at a first orientation that is associated with a first polarization angle. If at the first filtered mode, the first polarization angle is not perpendicular to the reflected polarized light, then privacy shutter 315 may be moved to state B. Otherwise, privacy shutter 315 may be kept in this mode.

At state B, privacy shutter 315 is in a second filtered mode, wherein polarizer 425 is at a second orientation that is associated with a second polarization angle. The second filtered mode may be between the first filtered mode and a closed mode of the privacy shutter. For example, the second filtered mode may be approximately halfway between the first filtered mode and the closed. If at the second filtered mode, the second polarization angle is not perpendicular to the reflected polarized light, then privacy shutter 315 may be moved to state A.

In another embodiment, camera 215 and polarizer 425 may remain in the same location as privacy shutter 315 is moved between the first orientation mode and the second orientation mode and polarizer 425 rotates. Accordingly, the polarization angle may change from the first polarization angle to the second polarization angle or vice versa as polarizer 425 rotates between the two orientations.

At state C, privacy shutter 315 is at the closed modes, wherein camera 215 may be covered by security mask 320. In this example, privacy shutter 315 can go from the first filtered mode to the second filtered mode then to the closed mode, and vice versa. Although the example herein shows two filtered modes, one of skill in the art may appreciate that there may be more than two filtered modes. Accordingly, the orientation and polarization angle of polarizer 425 may be different with each filtered mode.

Figure 6:
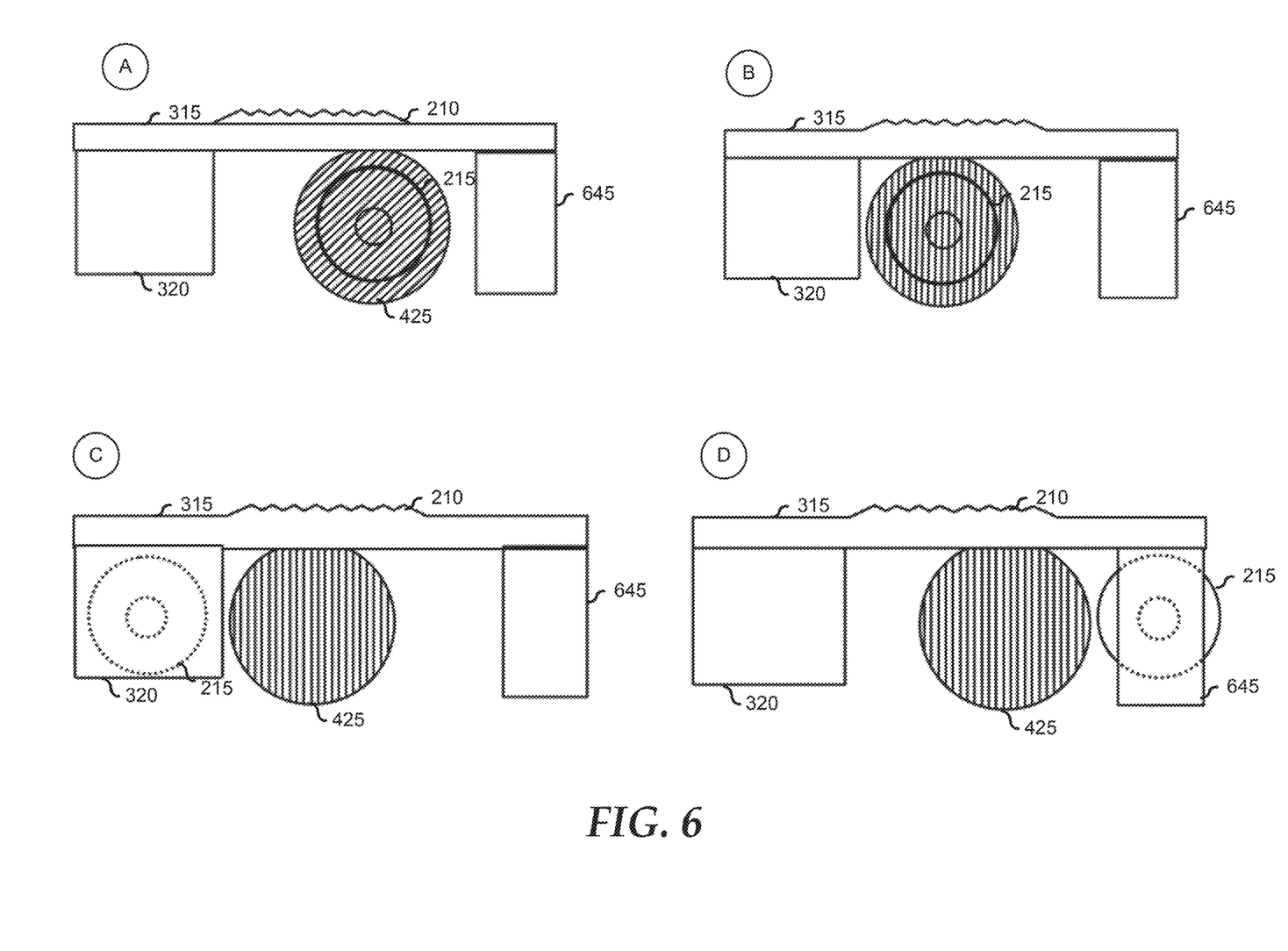

FIG. 6 shows a series of diagrams that depict how a polarizer is rotated to change orientation. The diagrams depicted include slider 210, camera 215, a security mask 320, polarizer 425, and a transparent film 645. One issue with using a polarizer is the loss of light. Because transparent film 645 may be made of clear material that allows visible light, such as glass or plastic, transparent film 645 allows the user to use camera 215 without loss of light. In this example, polarizer 425, security mask 320, and transparent film 645 may be physically coupled with privacy shutter 315, such that polarizer 425, security mask 320, and transparent film 645 move with privacy shutter 315 when a user slides privacy shutter 315 left to right or right to left.

FIG. 6 is annotated with a series of letters A, B, C, and D. Each of these letters represents a state of privacy shutter 315 and may not imply an order of operation. The states illustrate one example to aid in understanding this disclosure and should not be used to limit the claims. Subject matter falling within the scope of the claims can vary with respect to the order of the operations. At state A, privacy shutter 315 may be at a first filtered mode, whereas polarizer 425 may be at the first orientation that is associated with a first polarization angle. In this mode, polarizer 425 may be superimposed over camera 215. Privacy shutter 315 may be moved to other modes, such as the second filtered mode via slider 210.

At state B, privacy shutter 315 may be at the second filtered mode, whereas polarizer 425 may be at the second orientation that is associated with the second polarization angle. As such, polarizer 425 may rotate from the first filtered mode to the second filtered mode and vice versa. In this mode, polarizer 425 may be superimposed over camera

215. The location of polarizer 425 and camera 215 in the second filtered mode may be different than the location of polarizer 425 and camera 215 in the first filtered mode. However, polarizer 425 and camera 215 may be in the same location during both filtered modes. At state C, privacy shutter 315 may be in the closed mode, wherein camera 215 may be superimposed over or covered by security mask 320. At state D, privacy shutter 315 may be in an open mode, whereas camera 215 may be superimposed by transparent film 645.

Figure 7:
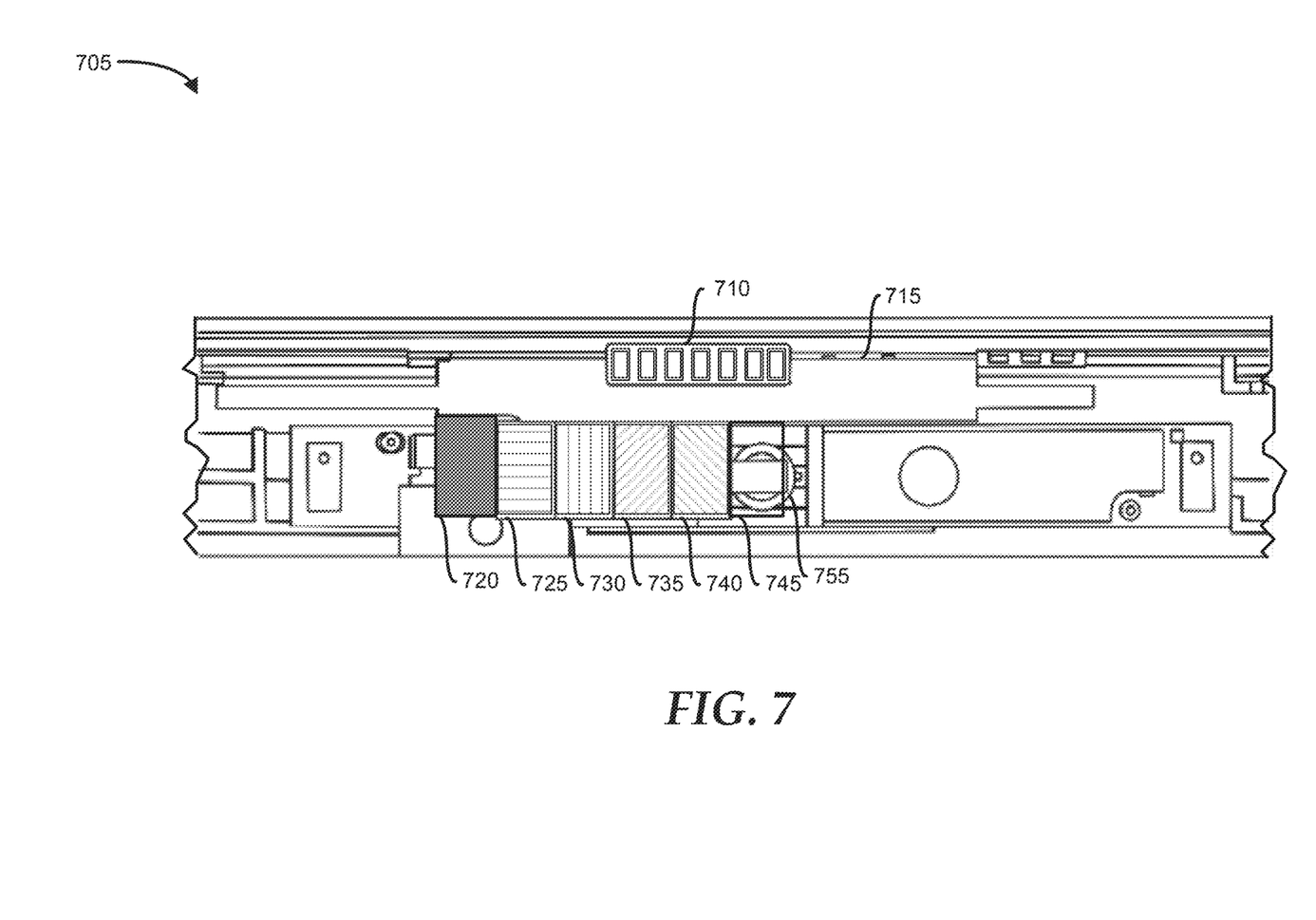
FIG. 7 is a detailed view of a display device section with its top cover removed, according to an embodiment of the present disclosure.

FIG. 7 shows a detailed view of a section 705 with its top cover removed. Section 705, which is similar to section 205 of FIG. 2, includes a privacy shutter 715 that includes slider 710. Privacy shutter 715 also includes a security mask 720, a polarizer 725, a polarizer 730, a polarizer 735, a polarizer 740, a transparent film 745, and a camera 755. Privacy shutter 715 may be similar to privacy shutter 315 while slider 710 may be similar to slider 210. Security mask 720 may be similar to security mask 320 while transparent film 745 may be similar to transparent film 645.

Privacy shutter 715 may be used to mechanically or electrically expose or close an aperture of camera 755 via slider 710. In addition, privacy shutter 715 may be used to cancel glare and/or reflection on the user's eyeglasses via one of polarizers 725, 730, 735, and 740. Each one of polarizers 725, 730, 735, and 740 have a different orientation, wherein each orientation may be associated with a different polarization angle. Thus, each one of the polarizers may have a different effect in eliminating or canceling glare and/or reflection on a surface, such as the user's glasses. The user may slide privacy shutter 715, which changes the polarizer at the front of camera 755. The user may continue sliding privacy shutter 715 until he or she reaches a desired effect.

Figure 8:
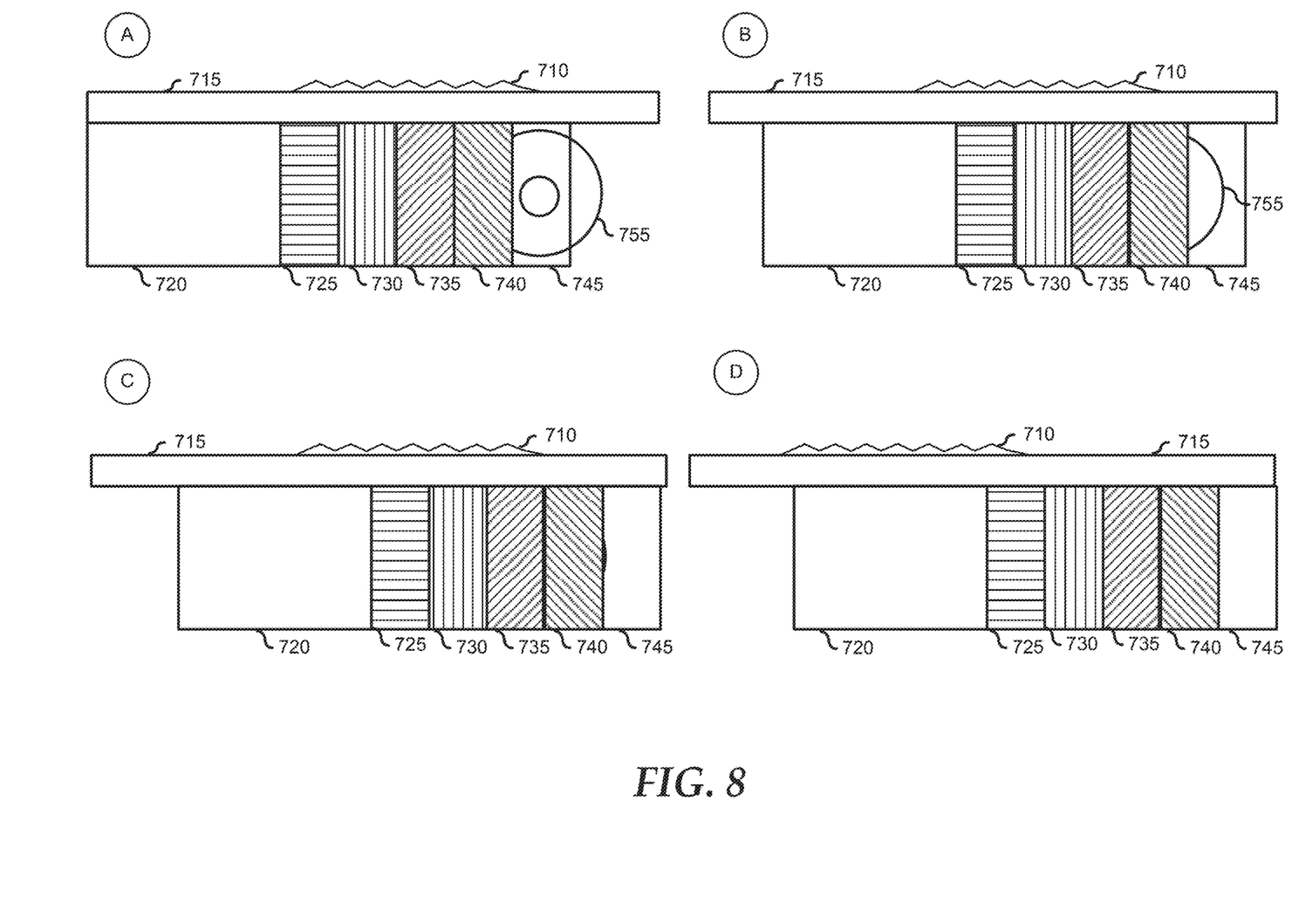
FIG. 8 is a series of diagrams that depict how a privacy shutter is used to filter screen reflection, according to an embodiment of the present disclosure.

FIG. 8 shows a series of diagrams that depict how a privacy shutter is used to change exposure on a camera. This includes changing a polarizer to cancel reflection and/or glare on a user's glasses. The diagrams depicted include slider 710, privacy shutter 715, camera 755, security mask 720, transparent film 745, and polarizers 730, 730, 735, and 740. In this example, slider 710 can mechanically or electrically move privacy shutter 715 from left to right or vice versa. Because security mask 720, transparent film 745, and polarizers 730, 730, 735, and 740 are physically coupled to privacy shutter 715, they may move with the movement of privacy shutter 715. Polarizers 730, 730, 735, and 740 are attached in different segments of privacy shutter 715 which allow users to slide to the segment of a polarizer orientation that matches reflected polarized light. In particular, the user may use slider 710 to selectively move privacy shutter 715 to use one of security mask 720, polarizers 725, 730, 735, 740, and transparent film 745.

Security mask 720, transparent film 745, and polarizers 725, 730, 735, and 740 may be arranged in a series. As such, instead of rotating the polarizer to change the orientation of the polarizer similar to polarizer 425, the user can change the polarizer that is disposed in front of camera 755. Because each polarizer has a different orientation, the user can select a polarizer of a particular orientation to cancel or eliminate the reflected polarized light.

FIG. 8 is annotated with a series of letters A, B, C, and D. Each of these letters represents a state of privacy shutter 715. The states illustrate one example to aid in understanding this disclosure and should not be used to limit the claims. Subject matter falling within the scope of the claims can vary with respect to the order of the operations. At state A, privacy shutter 715 is in an open or unfiltered mode, such that transparent film 745 may be superimposed over camera 755. From this mode, privacy shutter 715 may be moved to state B where privacy shutter 715 is at a first filtered mode. In this position, polarizer 740 may be superimposed over camera 755. Polarizer 740 may be of a first orientation that is associated with a first polarization angle. From this mode, privacy shutter 715 may be moved back to the unfiltered mode or a second filtered mode.

At state C, privacy shutter 715 may be in the second filtered mode, wherein polarizer 735 may be superimposed over camera 755. Polarizer 735 may be of a second orientation that is associated with a second polarization angle. From this mode, privacy shutter 715 may be moved back to the first filtered mode or a third filtered mode. At state D, privacy shutter 715 may be in the third filtered mode, wherein polarizer 730 may be superimposed over camera 755. Polarizer 730 may be of a third orientation that is associated with a third polarization angle. From this mode, privacy shutter 715 may be moved back to the second filtered mode or to a fourth filtered mode, wherein polarizer 725 may be superimposed over camera 755. Polarizer 725 may be of a fourth orientation that is associated with a fourth polarization angle. From this mode, privacy shutter 715 may be moved back to the third filtered mode or to a closed mode, wherein security mask 720 may be superimposed over camera 755. From the closed mode, privacy shutter 715 may be moved to a fourth filtered mode. Accordingly, privacy shutter 715 may be moved to use different polarizers.

Although the privacy shutter shown in the present disclosure is part of an integrated display device of an information handling system, one of skill in the art will appreciate that the privacy shutter may be part of a display device that is separate from the information handling system, such as a computer display monitor.

Figure 9:
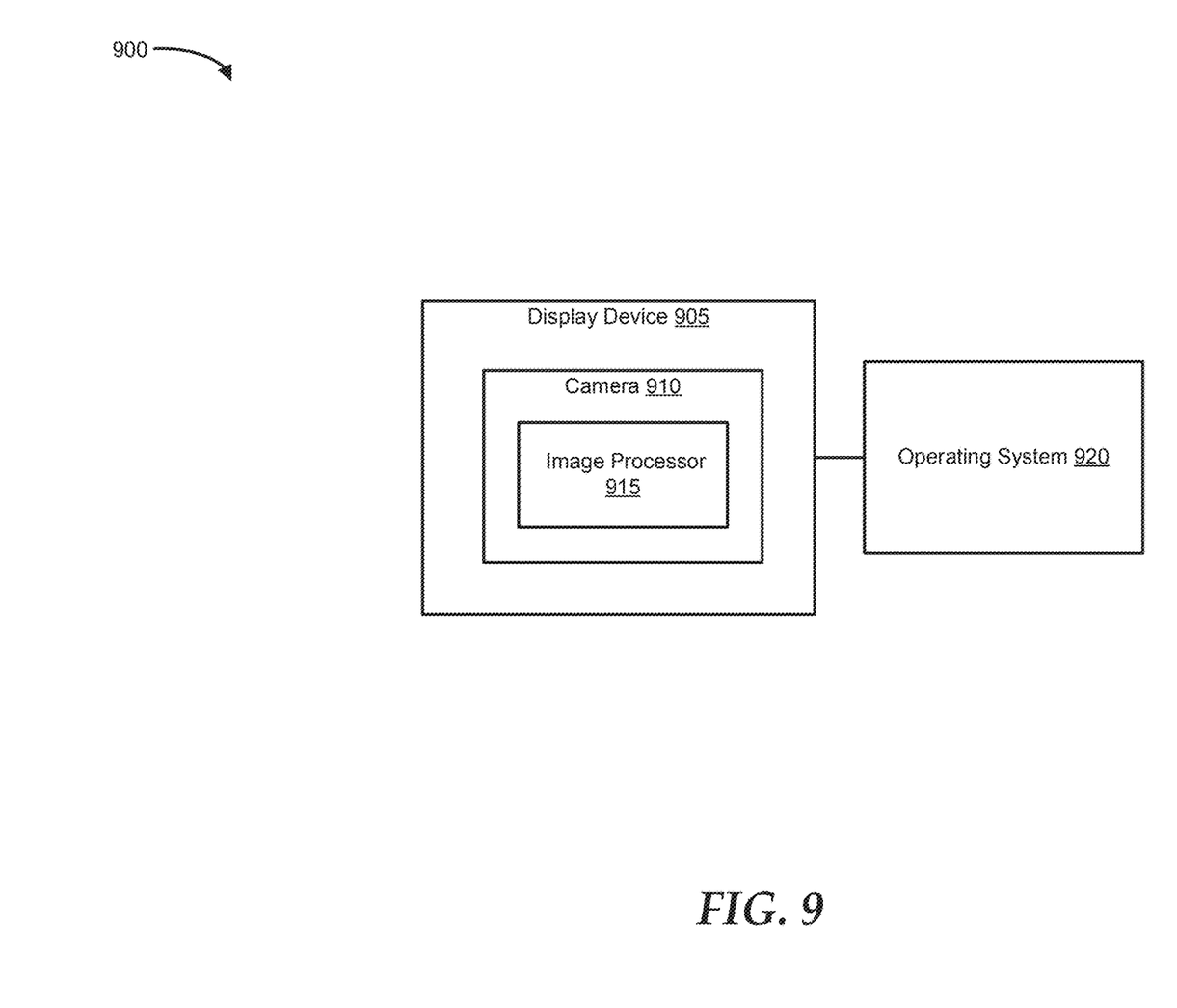
FIG. 9 is a block diagram of a system for canceling reflection on a user's glasses, according to an embodiment of the present disclosure.

FIG. 9 shows a system 900 for canceling reflection on a user's glasses. System 900 may be implemented in information handling system 200 of FIG. 2 and includes a display device 905, a camera 910, an image processor 915, and an operating system 920. Display device 905 may be similar to display assembly 220 of FIG. 2 while camera 910 may be similar to camera 215 of FIG. 2. Image processor 915 may be configured to receive data from camera 910 and determine whether a user of the information handling system has glasses. For example, image processor 915 may be configured to implement a trained artificial intelligence model to detect whether the user-facing camera 910 is wearing glasses. Image processor 915 may also be configured to detect if there is glare and/or reflection on the user's glasses. For example, image processor 915 may detect a reflected polarized light at camera 910. However, image processor 915 may no longer detect the reflected polarized light at camera 910 if the reflected polarized light is cut off by a polarizer that is oriented perpendicularly to the direction of the reflected polarized light.

The components of system 900 may be implemented in hardware, software, firmware, or any combination thereof. The components shown are not drawn to scale and information handling environment 200 may include additional or fewer components. In addition, connections between components may be omitted for descriptive clarity. Those of ordinary skill in the art will appreciate that the configuration, hardware and/or software components of system 900 depicted in FIG. 9 may vary. For example, the illustrative components within information handling system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 10:
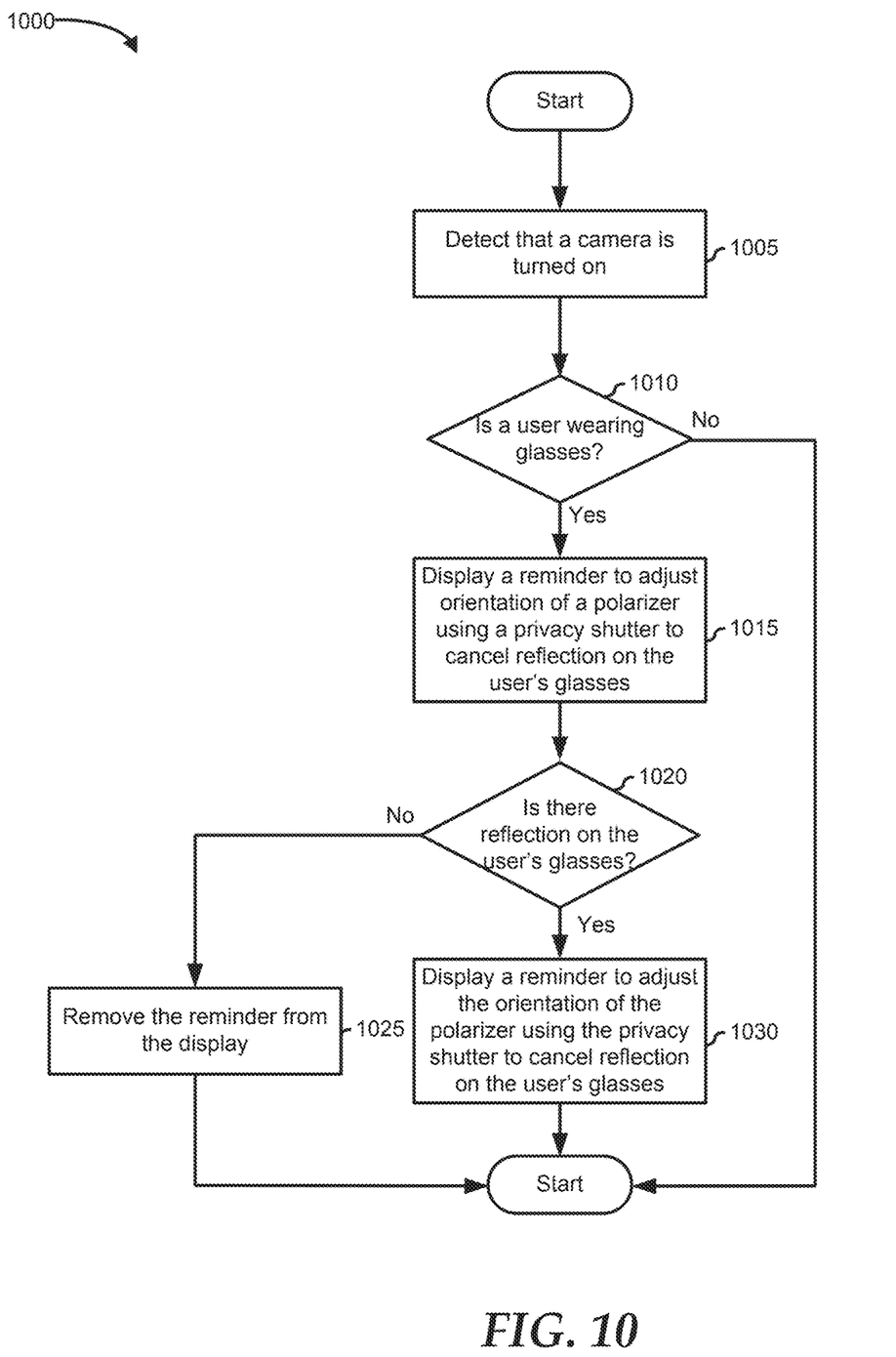
FIG. 10 is a flowchart of a method for canceling reflection on a user's glasses, according to an embodiment of the present disclosure.

FIG. 10 shows a flowchart of a method 1000 for canceling reflection on a user's glasses. Method 1000 may be performed by one or more components of system 900 of FIG. 9. However, while embodiments of the present disclosure are described in terms of system 900, it should be recognized that other systems may be utilized to perform the described method. One of skill in the art will appreciate that this flowchart explains a typical example, which can be extended to advanced applications or services in practice.

Method 1000 typically starts at block 1005 where the image processor may detect that the camera is powered on. For example, the processor may detect a signal when the camera is powered on. The method may proceed to decision block 1010 where the image processor may determine whether a user is wearing glasses. The image processor may use artificial intelligence based on trained models for the determination. If the image processor determines that the user is wearing glasses, then the "YES" branch is taken, and the method proceeds to block 1015. If the image processor determines that the user is not wearing glasses, then the "NO" branch is taken, and the method ends.

At block 1015, the image processor may direct the operating system to display a reminder to adjust the orientation of a polarizer using the privacy shutter to cancel reflection on the user's glasses. The method may proceed to decision block 1020 where the image processor may determine if there is reflection on the user's glasses. For example, the image processor may determine if there is a reflected polarized light on the camera. If there is no reflection on the user's glasses, then the "NO" branch is taken, and the method proceeds to block 1025. If there is a reflection on the user's glasses, then the "YES" branch is taken, and the method proceeds to block 1030. At block 1025, the image processor may direct the operating system to remove the display reminder. For example, the image processor may no longer detect the reflection after the user adjusts the polarizer superimposed over the camera, such that the polarizer is oriented perpendicularly to the reflection thereby canceling it. At block 1030, the image processor may direct the operating system to display the reminder to adjust the orientation of the polarizer using the privacy shutter to cancel the reflection on the user's glasses.

Although FIG. 10 shows example blocks of method 1000 in some implementations, method 1000 may include additional blocks, fewer blocks, different blocks, or differently arranged blocks than those depicted in FIG. 1000. Those skilled in the art will understand that the principles presented herein may be implemented in any suitably arranged processing system. Additionally, or alternatively, two or more of the blocks of method 1000 may be performed in parallel. For example, block 1015 and decision block 1020 of method 1000 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system, comprising:
   a camera disposed in a display device of the information handling system; and
   a privacy shutter configured to selectively rotate a polarizer to a first orientation or a second orientation, wherein one of the first orientation or the second orientation is used to filter reflected polarized light, and wherein the polarizer is superimposed over the camera in the display device.

2. The information handling system of claim 1, wherein the polarizer is mounted on a barrel sleeve.

3. The information handling system of claim 2, wherein the barrel sleeve is part of a camera assembly.

4. The information handling system of claim 2, wherein the privacy shutter includes a linear gear that is configured to engage with a circular gear of the barrel sleeve.

5. The information handling system of claim 1, wherein the privacy shutter includes a slider that is physically coupled to the privacy shutter and configured to slide the privacy shutter to the first orientation or the second orientation.

6. The information handling system of claim 1, wherein the reflected polarized light is incident on a user's eyeglass.

7. The information handling system of claim 1, wherein the privacy shutter is further configured to move a transparent cover to be superimposed over the camera.

8. A display device for an information handling system, the display device comprising:
   a camera disposed in the display device; and
   a privacy shutter configured to select a first polarizer with a first orientation or a second polarizer with a second orientation, wherein one of the first polarizer or the second polarizer is used to filter reflected polarized light.

9. The display device of claim 8, wherein the first polarizer and the second polarizer are physically coupled to the privacy shutter.

10. The display device of claim 8, wherein the privacy shutter includes a slider that is configured to slide the privacy shutter to the first polarizer or the second polarizer.

11. The display device of claim 8, wherein the reflected polarized light is incident on a user's eyeglass.

12. The display device of claim 8, wherein the privacy shutter is further configured to move a transparent cover to be superimposed over the camera.

\* \* \* \* \*